United States Patent
Rabi

(10) Patent No.: US 11,235,617 B1
(45) Date of Patent: Feb. 1, 2022

(54) PLATFORM TRANSPORT WHEEL ASSEMBLY AND METHOD OF USE

(71) Applicant: Sam Rabi, San Diego, CA (US)

(72) Inventor: Sam Rabi, San Diego, CA (US)

( * ) Notice: Subject to any disclaimer, the term of this patent is extended or adjusted under 35 U.S.C. 154(b) by 0 days.

(21) Appl. No.: 17/118,470

(22) Filed: Dec. 10, 2020

(51) Int. Cl.
*B60B 33/00* (2006.01)

(52) U.S. Cl.
CPC ........ *B60B 33/0068* (2013.01); *B60B 33/001* (2013.01); *B60B 33/0039* (2013.01); *B60B 33/0057* (2013.01)

(58) Field of Classification Search
CPC ........... A45C 5/143; A45C 5/14; A45C 5/141; A45C 5/145; A45C 5/142; A45C 2005/142; B60B 33/00; B60B 33/0002; B60B 33/0005; B60B 33/001; B60B 33/0015; B60B 33/0013; B60B 33/08; B60B 33/0039; B60B 33/0042; B60B 33/0049; B60B 33/0057; B60B 33/006; B60B 33/0068; B60B 19/12; B60B 2200/45; B60B 2360/32; B60B 2360/324; B60B 2900/121; B60B 2900/212; B60B 2900/321; B62B 5/0083; B62B 2301/252; Y10T 16/188; Y10T 16/1887; Y10T 16/1889
See application file for complete search history.

(56) References Cited

U.S. PATENT DOCUMENTS

| | | | | |
|---|---|---|---|---|
| 1,743,255 A | * | 1/1930 | Vervoort | B60B 33/0028 16/21 |
| 2,426,664 A | * | 9/1947 | Blazey | B60B 33/00 16/31 R |
| 2,986,746 A | * | 6/1961 | Jackson | B60B 33/0002 5/8 |
| 3,345,675 A | * | 10/1967 | Haydock | B60B 33/00 16/45 |
| 3,445,882 A | * | 5/1969 | Miano | B60B 33/0028 16/21 |
| 3,858,271 A | * | 1/1975 | Howard | B60B 33/00 16/45 |
| 4,125,183 A | * | 11/1978 | Lang | B65G 13/10 16/46 |
| 4,382,637 A | * | 5/1983 | Blackburn | B65G 39/025 16/25 |
| 4,696,583 A | * | 9/1987 | Gorges | B60B 33/08 16/26 |

(Continued)

FOREIGN PATENT DOCUMENTS

WO    WO-9815480 A1 * 4/1998 ........ B60B 33/0028

*Primary Examiner* — Chuck Y Mah
(74) *Attorney, Agent, or Firm* — Procopio, Cory, Hargreaves & Savitch LLP

(57) ABSTRACT

A low profile wheel assembly suitable for use in dollies, decks or any other platform designed for moving freight or other heavy items. It includes a wheel, a carriage on which the wheel bracket is mounted for rotation about a first axis. The wheel carriage unit fits inside an outer housing unit of this wheel assembly and by means of low friction between the wheel carriage unit and the outer housing unit enabling the wheels carriage unit to rotate concentrically while inside the outer housing unit at a different axis than the first. In this manner and at the same time that the wheel is rolling on a surface, it can change directions of where it is rolling to.

12 Claims, 8 Drawing Sheets

(56) References Cited

U.S. PATENT DOCUMENTS

| | | | | | |
|---|---|---|---|---|---|
| 4,778,041 | A | * | 10/1988 | Blaurock | B65G 39/025 |
| | | | | | 193/35 MD |
| 5,097,565 | A | * | 3/1992 | Shorey | B60B 33/0002 |
| | | | | | 16/20 |
| 5,134,753 | A | * | 8/1992 | Rekuc | A45C 5/14 |
| | | | | | 16/18 CG |
| 5,598,605 | A | * | 2/1997 | Tomasiak | A47L 9/0009 |
| | | | | | 16/31 R |
| 6,223,388 | B1 | * | 5/2001 | Sey | B60B 33/0002 |
| | | | | | 16/20 |
| 6,244,417 | B1 | * | 6/2001 | Timmer | B60B 33/0002 |
| | | | | | 193/35 MD |
| 6,604,258 | B2 | * | 8/2003 | Saggio | B60B 33/0018 |
| | | | | | 16/42 R |
| 6,854,159 | B2 | * | 2/2005 | Ruitenbeek | B60B 33/0002 |
| | | | | | 16/18 CG |
| 8,657,309 | B2 | * | 2/2014 | Taylor | B60B 33/0021 |
| | | | | | 280/47.32 |
| 8,739,364 | B2 | * | 6/2014 | Fromm | B60B 33/063 |
| | | | | | 16/19 |
| 10,850,843 | B2 | * | 12/2020 | Dallum | F16C 17/04 |
| 2017/0043621 | A1 | * | 2/2017 | Mangano | B60B 33/0049 |

* cited by examiner

PLATFORM TRANSPORT WHEEL ASSEMBLY AND METHOD OF USE

FIELD OF THE INVENTION

The present invention relates to wheel assemblies for use in, for example, dollies and decks.

BACKGROUND OF THE INVENTION

Household, office or the like heavy items and the like have to be manhandled and moved from one place to place around different locations. Moving such items will require surface friction reducing devices such as wheel assemblies, rollers or ball units. These devices facilitate relocation of a load over a surface or if these wheel assemblies are mounted on a stationary surface to displace a load over wheel assemblies. When the wheel assemblies are mounted on a mobile framework to transfer a load, they are called "dollies". When these wheel assemblies are part of a conveyor system they are fixed, in which case they are usually referred to as "decks". Dollies and decks of this kind are also used in a wide range of other materials handling applications.

Such wheel assemblies are to be regarded as "consumables" in this field. In the United States alone, more than two million wheel assemblies are used each year. It is, consequently, important that the wheel assemblies themselves are of rugged construction so as to minimize wear, that they are mounted on dollies or decks as to minimize the likelihood of damage and, finally, that they are mounted in such a way that they can be quickly and easily be replaced when worn.

In the case of dollies it is also desirable that the dollies themselves should be of lighter weight construction so that they can be moved easily from place to place. Most known dollies consist of a sub-frame on which the wheel assemblies are mounted. A strong relatively lighter sub-frame is needed to support the wheel assemblies. To lessen the chance of tipping of load over, the dolly needs to be as close to the ground as possible and with a shallow wheel assembly that can be achieved. Thus, for maximum stability of moving load via dolly, a dolly would need to be as close to the ground as possible. This can be achieved when dolly with the wheel assembly be made of rigid material that is able to handle the weight while transporting it. It is equally important to prevent load transported from tipping over is to have a smooth steering of dolly while transporting a load. The shallower the wheel assembly, the less material needed to construct a dolly and thus less costly to manufacture and sell to consumers.

In the case of decks which are not only used in airport buildings like conveyors and the like but also anytime a cargo need to be moved from one place to another. Whenever the space and weight is at a premium, it is essential that decks be made as shallow as possible so that they do not reduce the usable height of the cargo hold and, hence the available storage space, any more than necessary.

SUMMARY OF THE INVENTION

In accordance with an aspect of the invention there is provided a wheel assembly comprising a wheel, a carriage on which the wheel is mounted for rotation about a first axis and a means of reducing friction surface enabling the carriage wheel unit to rotate about a second axis at an angle different from the first axis, the first axis being offset from the second; the means of reducing friction between the wheel carriage unit and the outer housing unit of the wheel assembly and this allows for the rotation and disposition of carriage wheel unit concentrically within the outer housing unit of the wheel assembly.

Since the carriage wheel unit height is shallow fitting inside the outer caster housing, the whole wheel assembly is shallow and has a lower profile than many other standard wheel assemblies. Using a smaller diameter wheel with its axis length is greater than its diameter keeps this caster low profile while distributing less load per surface area on the surface it is rolling on or rolling on to it. Distribution of the load over a larger wheel contact area with a surface renders this wheel assembly less surface marking or damaging and more stable at higher weight.

Shallowness of the dolly/deck holding these casters has favorable cost implications in that the dolly/deck can be made more cheaply due to the less material needed to construct the dolly or deck. Shallowness, low profile, also gives it more stability from tipping over as it is closer in contact with the floor in the case of a dolly.

Wheel of this wheel assembly is mounted so that only a portion of the wheel projects below the lower surface of the carriage wheel unit, the vulnerable parts of the wheel assembly are largely protected from damage caused by impacts. If, as is preferable, the pivot axis about which the wheel rotates is imbedded inside the carriage unit and in turn inside the outer housing unit of the wheel assembly so that the torque arising from lateral impacts to the wheel is also minimized.

The wheel assembly and decks have been discussed above with a view to use with the wheel of each wheel assembly protruding downwards to support applications where, for example, heavy items are to be moved into and out of tight spaces. It may also be equally used in an inverted position where the wheels protrude upwards to support items moved over the surface of the deck.

Another aspect of the invention involves a low profile compact concealed swivel wheel assembly in which a wheel is mounted to a body carriage. Said wheel rotating freely around its horizontal wheel axis while attached to said carriage. Said carriage wheel assembly fits inside the outer housing part of said wheel assembly and is separated from it by means of reducing friction for ease of moving the carriage concentrically inside and relative to said outer housing, whereby said carriage wheel assembly can change directions smoothly as said wheel is rolling on a surface while concealed inside its said low profile outer housing.

One or more implementations of the aspect of the invention immediately above includes one or more of the following: said wheel of said wheel assembly is cylindrical in shape and in contact along its entire axis or length with the surface it is rolling on to maximize weight distribution it is supporting on the surface it is rolling on to minimize or eliminate chance of marking or damaging to said surface as well as handling greater weight capacity with better lateral stability; said wheel of said wheel assembly has a low profile which will markedly reduce chance of tipping over of an object resting on the platform it's attached to by keeping said platform closer to the surface it is rolling on. Thus, it is safer to use said wheel assembly to transport objects than others of greater height as it will have a lower Tipping Factor. Tipping Factor=Weight×Height from floor/Tipping Force. This maximizes lateral stability while transporting an object; any part of said wheel assembly shall be comprised of any rigid weight supporting material that is suitable for the weight rating for said wheel assembly; said carriage mounts inside said outer housing part of said wheel assembly, in a concentric alignment, to ensure balanced and smooth rotation between the two parts. There exists means of reducing friction between said carriage and said outer housing parts to ensure the sliding between said carriage and said outer housing which gives said wheel assembly smooth steering capability; said carriage has an outer lip to block debris from entering between the two rotating surfaces of said carriage and said outer housing parts that debris will otherwise impede rotation by sliding of the two surface against each other. This will ensure durability in use with longer lasting lifetime. Said outer lip of carriage is tapered so as to allow smooth sliding on surfaces that said wheel will be difficult to roll on; said wheel assembly has a simple minimalistic design which renders it very low cost to manufacture, sturdy in its ability to handle heavier loads, smooth functionality and at same time has a very low profile.

A further aspect of the invention involves a swivel wheel assembly comprising an outer housing; and a carriage wheel assembly rotatably received in and rotating relative to the outer housing about an axis, the carriage wheel assembly including a carriage and a wheel rotatably mounted within and rotating relative to the carriage about an axis different from the axis that the carriage wheel assembly rotates about, the wheel including a longitudinal length and a diameter, and the longitudinal length of the wheel is greater than the diameter of the wheel, maximizing weight distribution on the wheel and minimizing marking or damaging an underlying or contacting surface.

One or more implementations of the aspect of the invention described immediately above includes one or more of the following: one of the carriage wheel assembly and the outer housing includes a hole and the other of the carriage wheel assembly and the outer housing includes one or more projections that is rotatably received in the hole to allow the carriage wheel assembly to be rotatably received in and rotating relative to the outer housing; the carriage wheel assembly includes the hole and the outer housing includes the one or more projections that is rotatably received in the hole to allow the carriage wheel assembly to be rotatably received in and rotating relative to the outer housing; the one or more projections include a plurality of flexible tabs that are both lockingly engaged within and rotatably received within the hole to allow the carriage wheel assembly to be rotatably received in and rotating relative to the outer housing; the plurality of flexible tabs together form a larger diameter head and a smaller diameter shaft that are received within the hole to allow the carriage wheel assembly to be rotatably received in and rotating relative to the outer housing; the outer housing includes a center hole lined with the plurality of flexible tabs; the outer housing and the carriage wheel assembly are concentric; the wheel is cylindrical; the carriage includes a bottom or distal end and the wheel is rotatably mounted to the carriage at the bottom or the distal end; the wheel is cylindrical, the carriage includes a bottom or distal end, and the wheel is rotatably mounted to the carriage at the bottom or the distal end, maintaining sufficient clearance between the bottom or the distal end and the underlying or contacting surface while minimizing tipping factor; both the outer housing and the carriage wheel assembly include respective annular channels that cooperate to form a single bearing channel; and bearings received in the single bearing channel to minimize rotational friction between the outer housing and the carriage wheel assembly as the carriage wheel assembly rotates relative to the outer housing; and/or the carriage includes an outer tapered lip to block debris from entering between the carriage wheel assembly and the outer housing and impeding rotation and allowing smooth sliding on surfaces that the wheel will be difficult to roll on.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
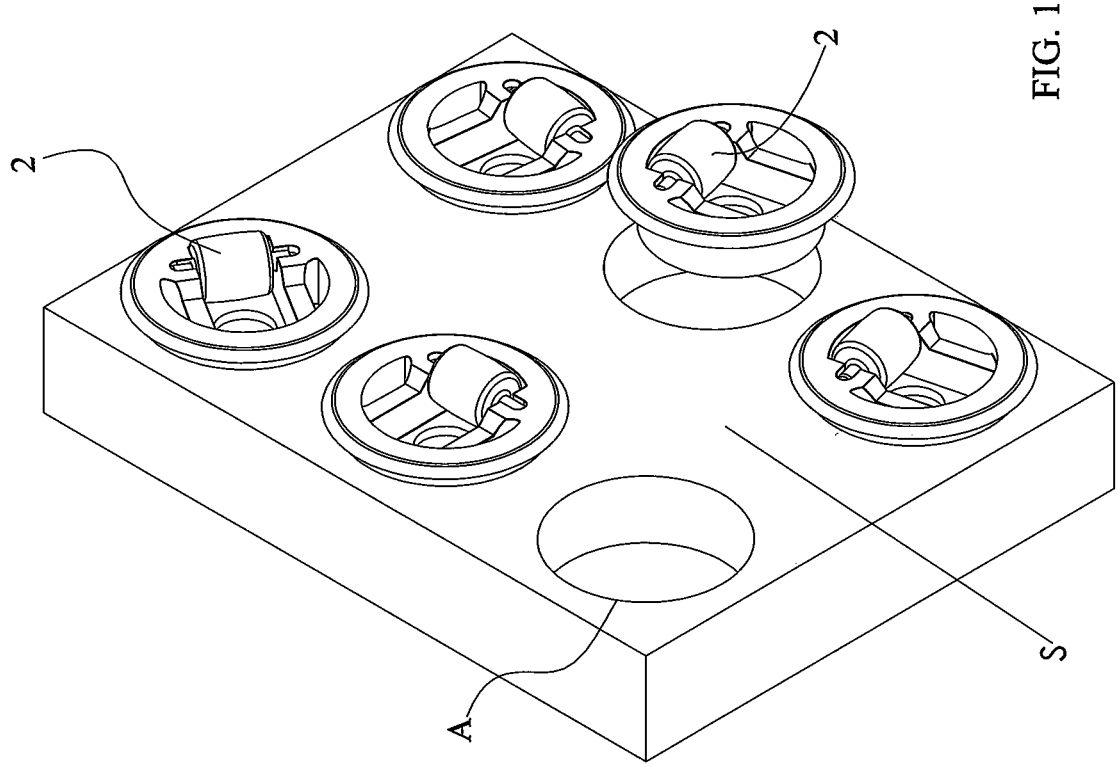
FIG. 1 shows a perspective view from above of part of a dolly or conveying device to the invention.

The conveying device shown in FIG. 1, for example, a dolly or deck of the kind described above, comprises a flat plate S with circular apertures A through which the wheel assemblies fit and part of the wheel 2 protrude of plurality of wheel assemblies. The apertures are spaced apart in a regular array e.g., such that when viewed in plane the centers of the apertures are at the corners of a triangle, square or at circumflex of a circular disk. A series of plates S may be joined together to form a track along which a load may be pushed over the track rolling on the protruding wheels of the wheel assemblies 2. The upper surface of plate S may be horizontal or inclined.

Figure 2:
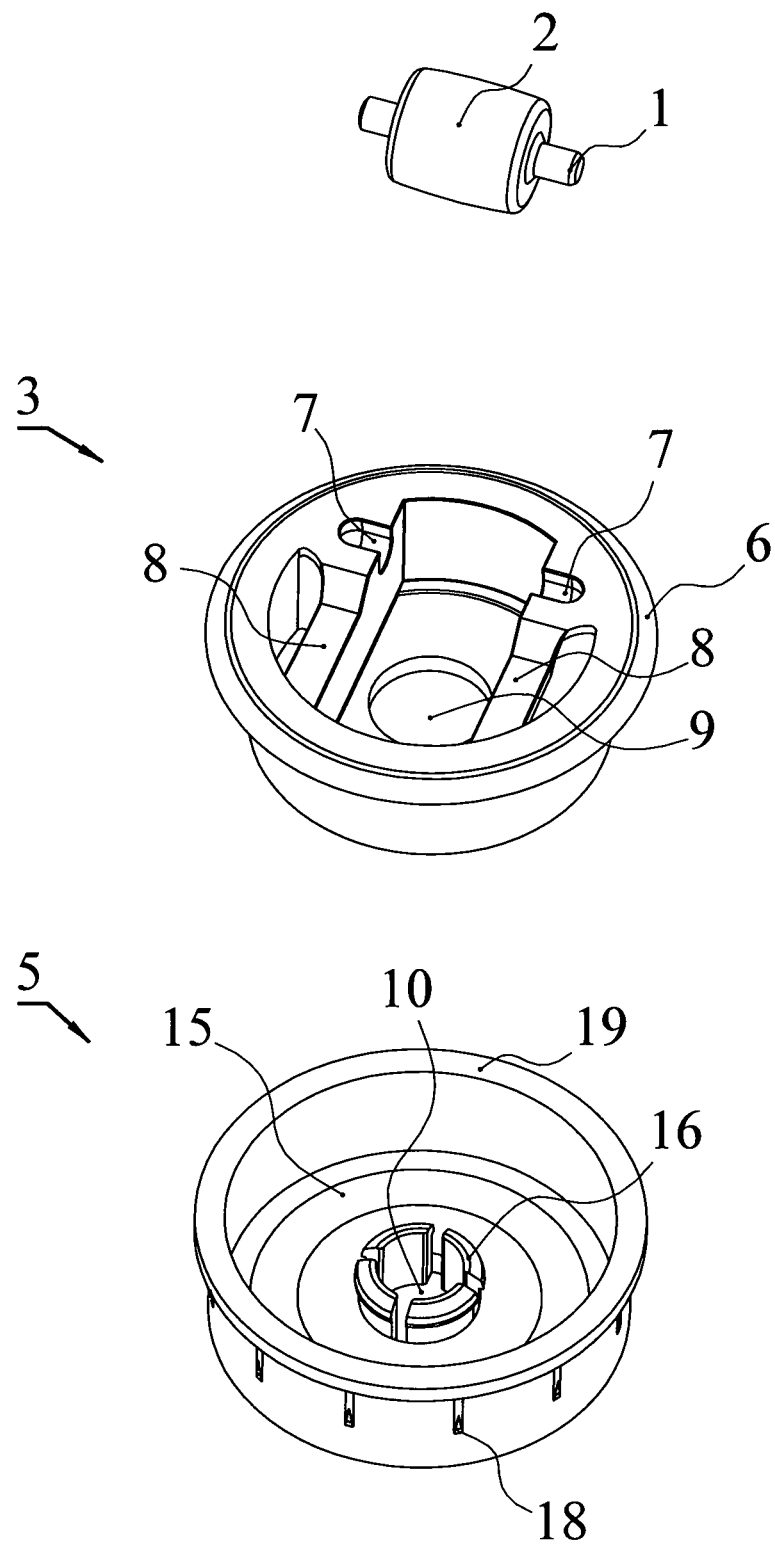
FIG. 2 shows an exploded view of a wheel assembly forming part of a dolly or conveying device according to a first embodiment.

As shown in FIG. 2, a wheel assembly in accordance with an embodiment of the invention comprises a wheel 2 to spin freely around an Axle Pin 1 in which this Axle Pin-Wheel 1, 2 assembly fitting in its carriage piece 3. The axle pin-wheel-carriage 1, 2, 3 seats in the outer housing unit 5 separated by means of reducing friction such as bearings between the two parts as to allow smooth rotation of the axle pin-wheel-carriage assembly 1, 2, 3 while inside the outer wheel assembly housing 5 and this smooth rotation is what is responsible for the smooth directional change steering of the wheel assembly.

Figure 3:
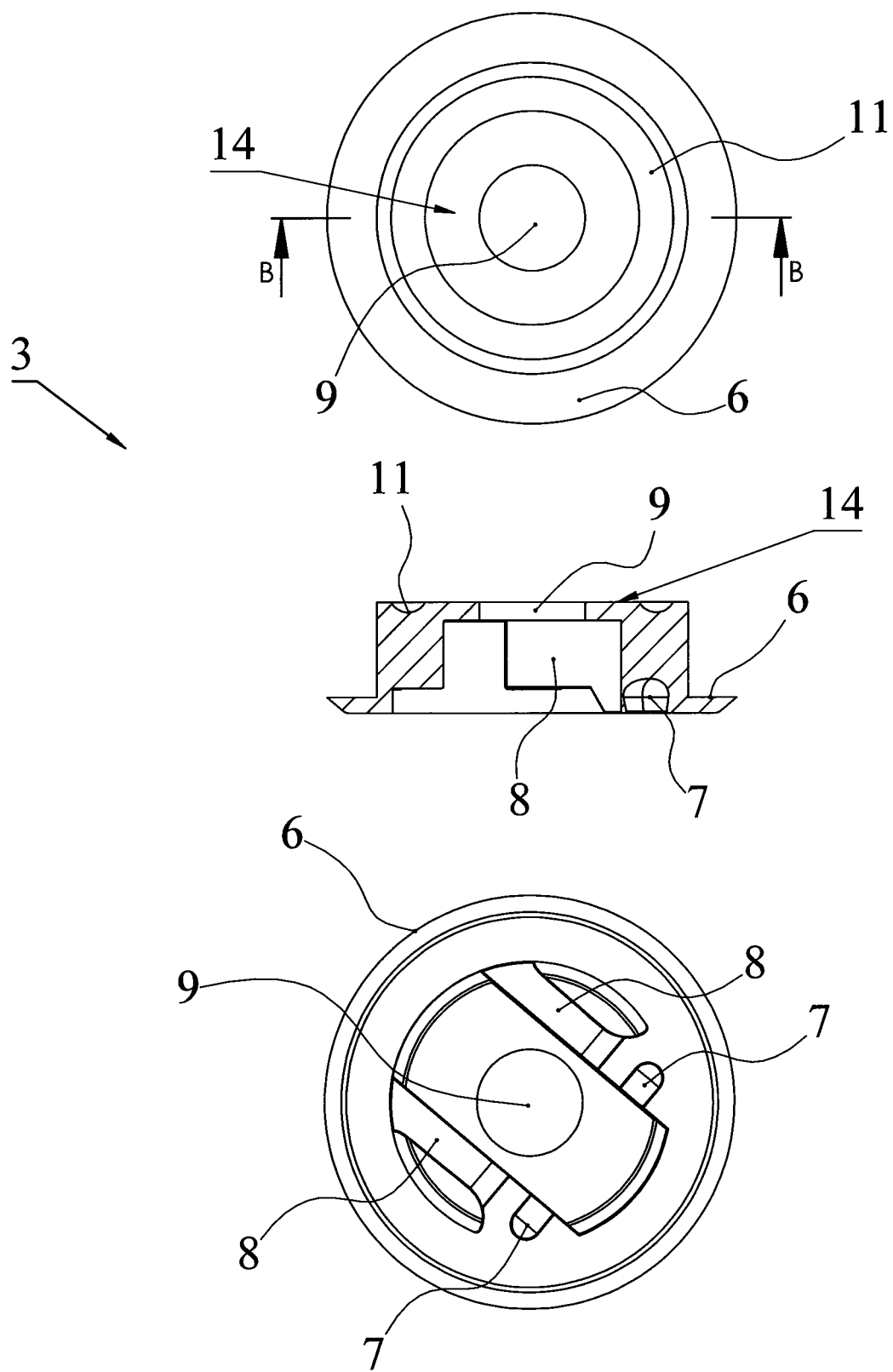
FIG. 3 shows detail view of carriage part of wheel assembly shown in FIG. 2.

As shown in FIG. 3, the Carriage 3 is a generally shallow cylindrically shaped part with one side having a center hole 9 and the other side is open with a circumferential lip 6 extending outward. The open side is where the wheel 2 mounts and protrudes. The axle pin-wheel assembly 1, 2 fits in the Carriage piece 3 with the opposite ends of the axle pin 1 fitting in two opposite hubs 7 that are part of parallel forks 8 in carriage piece 3. The axle pin-wheel assembly 1, 2 sits off center of the carriage piece 3 close to its circumference. The pin hubs 7 on opposite sides of the wheel are grooves in the thicker part of parallel forks 8. The forks 8 run as chords parallel to diameter of the circular carriage piece 3. Forks 8 are relatively thicker in construction for strength support and to distribute the load exerted on them by across the whole carriage part of the wheel assembly. The outer side of the carriage 14 has a shallow circular groove 11 for any type of friction reducing means including bearings 4 to fit in with a height of about half of the bearings' diameter.

Figure 4:
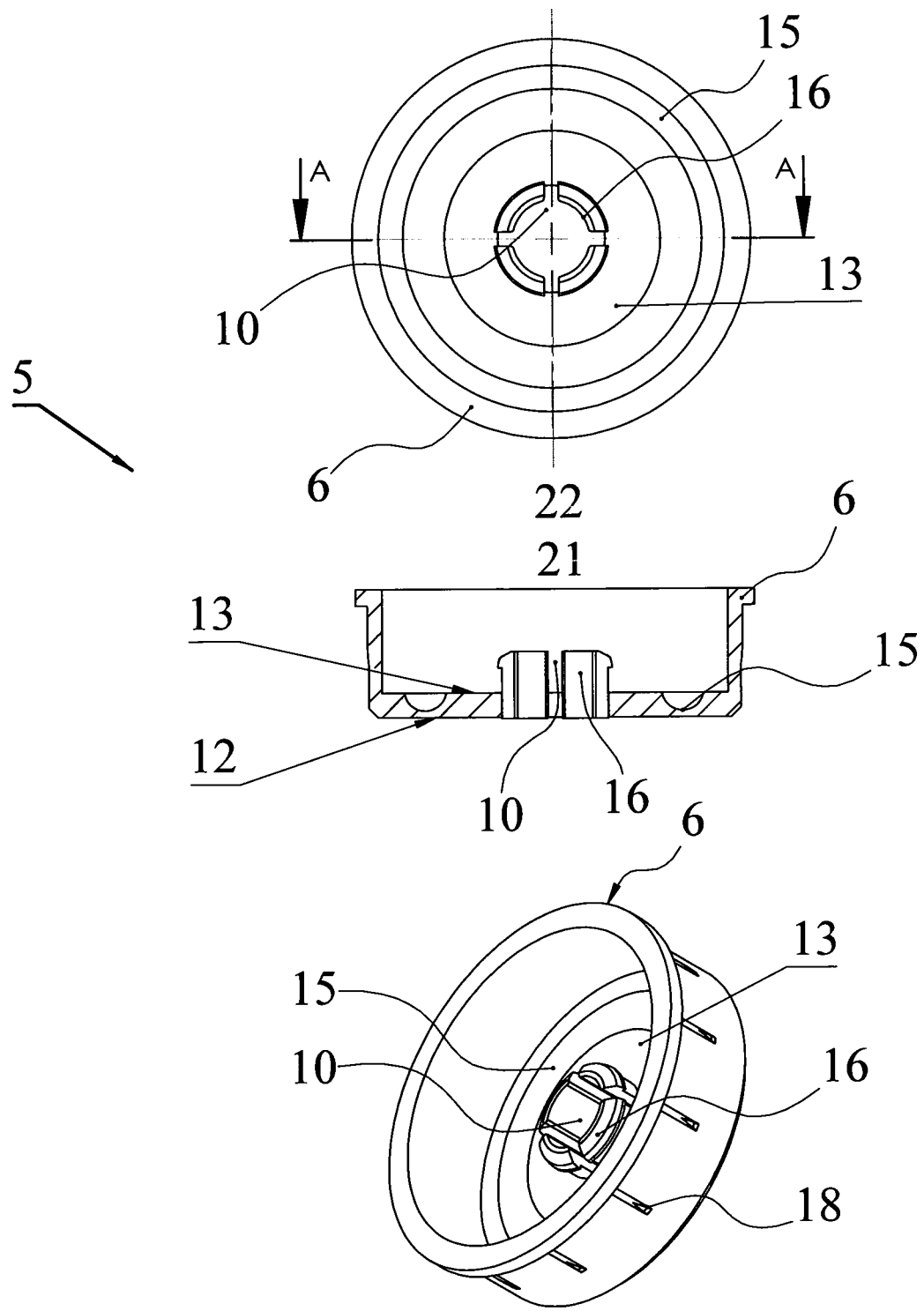
FIG. 4 shows detail view of outer housing of wheel assembly shown in FIG. 2.
Figure 9:
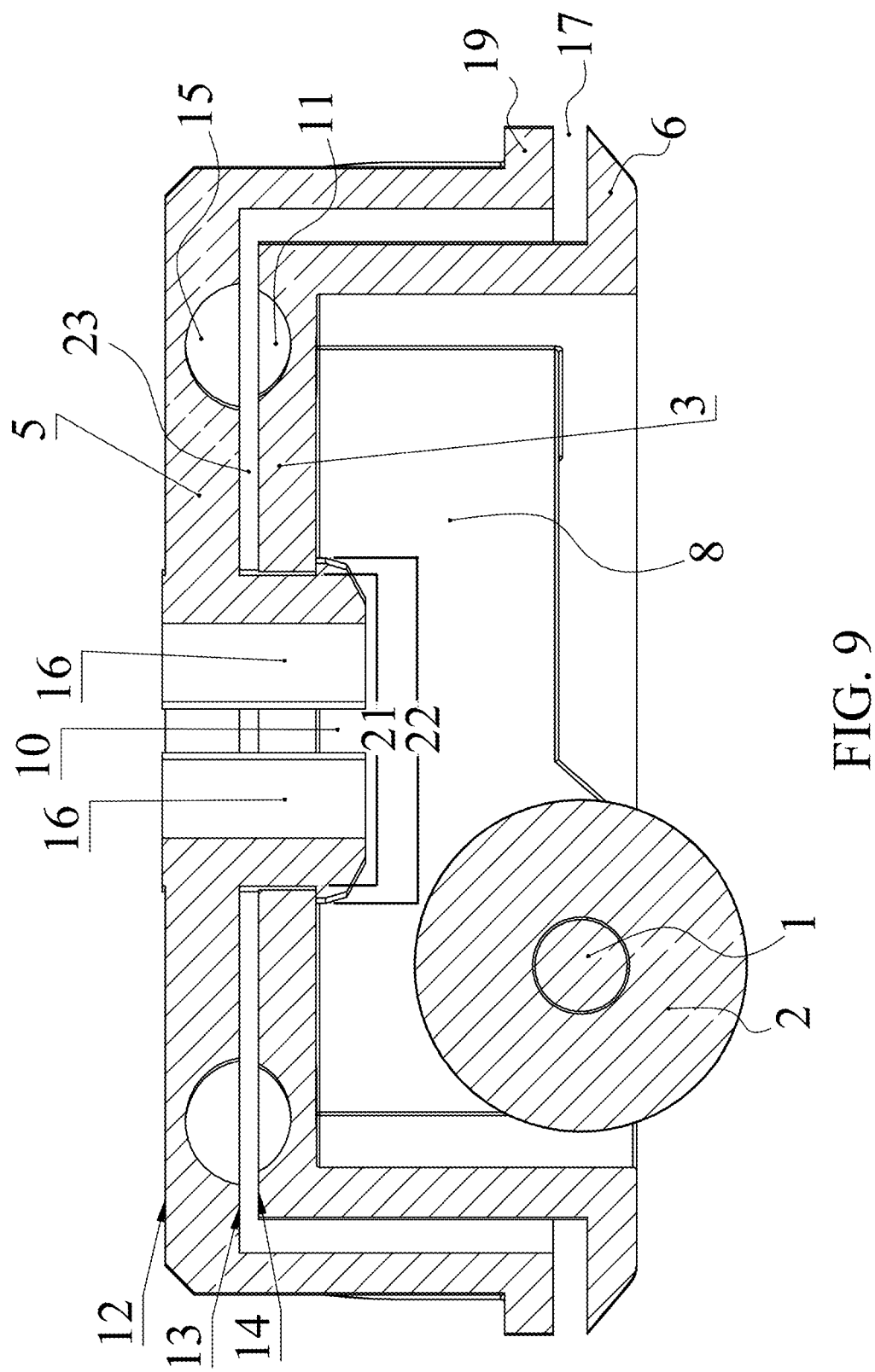
FIG. 9 shows a cross-sectional view of the wheel assembly shown in FIG. 2.

FIG. 4 shows the Outer Housing of wheel assembly 5 in which the carriage 3 part fits inside of it. The Outer Housing 5 is also a shallow cylinder with one end open and the other side 12 having a center hole 10 lined with four locking tabs 16 extending to interior of outer housing 5 part. The inner side 13 of this outer housing 5 part has a annular channel 15 for the other half of the bearings to fit in to separate the Outer Housing 5 from the Carriage 3 while allowing spinning motion between the Outer Housing piece 5 relative to the Carriage 3 and vice versa. The means of low friction like bearings 4 are seated in a shallow circular channel 15 on the inner side 14 of the Outer Housing piece 5. This annular channel 15 is matched positionally with another on the outer side of the carriage 11 piece so as about half of the bearings height is in channel of the Outer Housing 5 and the other half of the bearings in the channel of the carriage piece 3. The bearings fit in between the two annular channels of the outer 5 and inner 3 housing parts creating a space of separation between the two pieces for purpose of lowering friction as they rotates concentrically for purpose of directional change of the carriage wheel assembly. Movement of inner housing piece relative to outer housing is concentric aided by means of low friction like bearings which is responsible for the smooth steering of the wheel assembly as direction of platform transport platform FIG. 1 changes while carrying a load. The Outer Housing 5 of the wheel assembly is held attached to the inner housing by the four tabs 16 that are part of the outer housing lock into the circular hole 9 part of the Carriage 3 piece as shown in FIG. 9. The plurality of flexible tabs 16 together form a larger diameter head 22 and a smaller diameter shaft 21 that are received in the hole of the carriage 3 to both lockingly engage within and be rotatably received within the hole 9 to allow the carriage wheel assembly to be rotatably received in and rotating relative to the outer housing as this is also illustrated in a larger scale in FIG. 9.

The space 17 in between the outer 5 and inner 3 housing of the wheel assembly is covered by the extended lip 6 of the inner 3 housing part of the wheel assembly. This extended lip 6 is annulus part of the rim of the carriage 3 piece which blocks the ingress of debris into this space 17 to prevent it from reaching the low friction means like bearings to ensure clean smooth operation of the caster and for an extended period of time.

Figure 5:
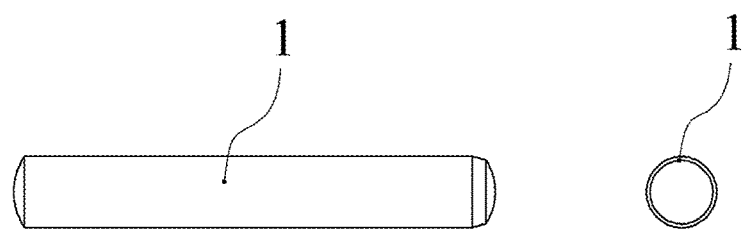
FIG. 5 shows detail view of wheel Pin of wheel assembly shown in FIG. 2.
Figure 6:
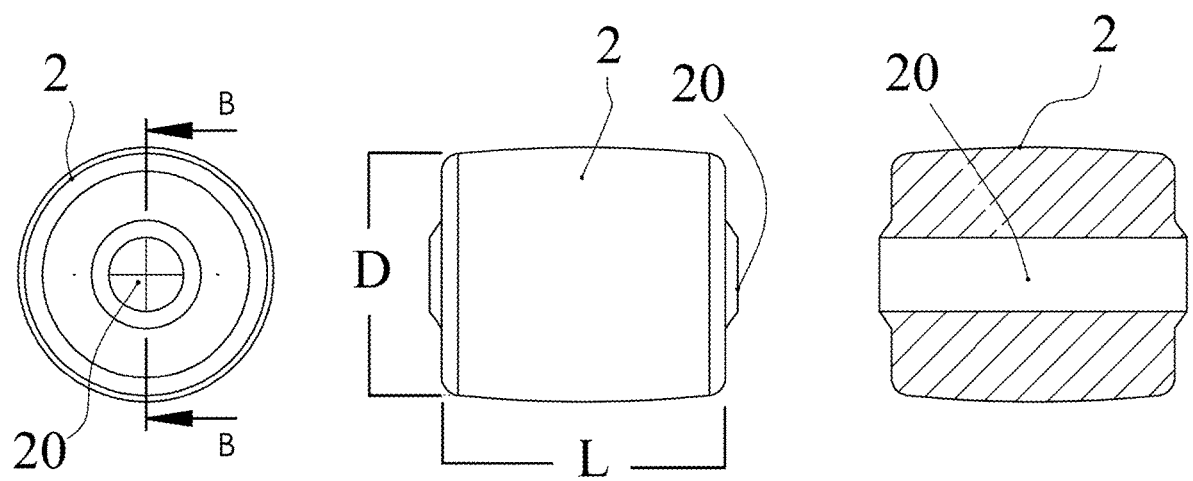
FIG. 6 shows detail view of wheel of wheel assembly shown in FIG. 2.

FIGS. 5 and 6 illustrate a detailed view of the axle pin 1 made of any rigid material that is able to withstand weight rating of the wheel assembly. This axle pin 1 has a smooth surface as to minimize the friction generated while the inserted wheel 2 is spinning. Diameter of the hole 20 in the wheel 2 for the axle pin 1 is only slightly larger than the diameter of the axle pin 1 itself to allow free spinning of the wheel around this axle pin 1. The wheel 2 is also made of a rigid material as to withstand the weight rating of this wheel assembly. The wheel 2 has an axis length or longitudinal length L that is greater than its diameter D as shown in FIG. 6.

Figure 7:
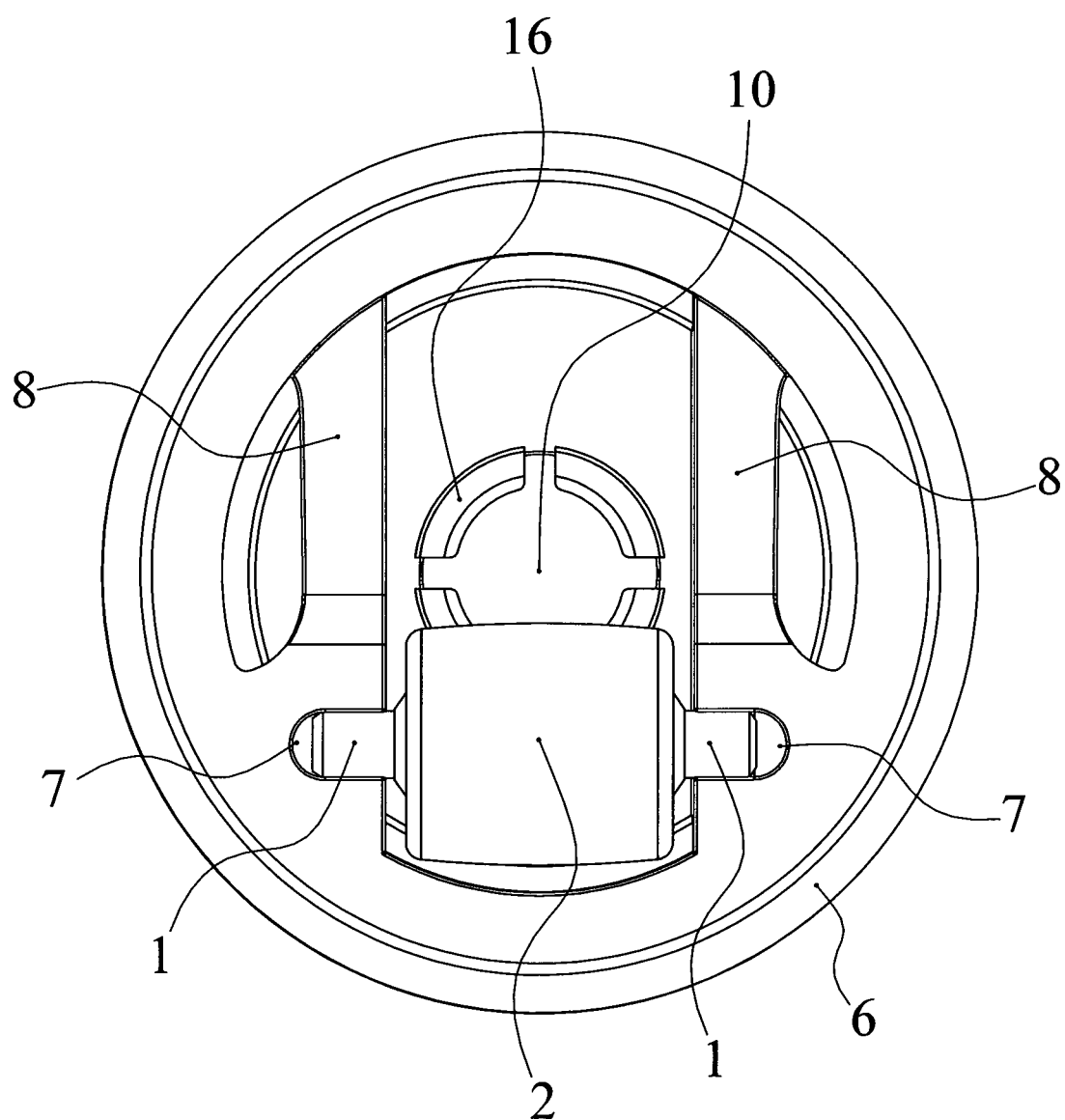
FIG. 7 shows a bottom view of the wheel assembly shown in FIG. 2.

FIG. 7 illustrates the bottom view of surface of wheel assembly and the manner in which the wheel is attached to wheel assembly via axle pin 2. The axle pin opposite ends snap in their hubs 7 in which they are part of the parallel forks 8 in that span the carriage part parallel to diameter of carriage 3 part. Forks 8 are made thicker as to distribute load across the wheel assembly. Also shown is the lip 6 around the perimeter of the carriage part of wheel assembly and functions to block any foreign material from entering into the wheel assembly space 17 to ensure durability and smooth functioning of wheel assembly.

Figure 8:
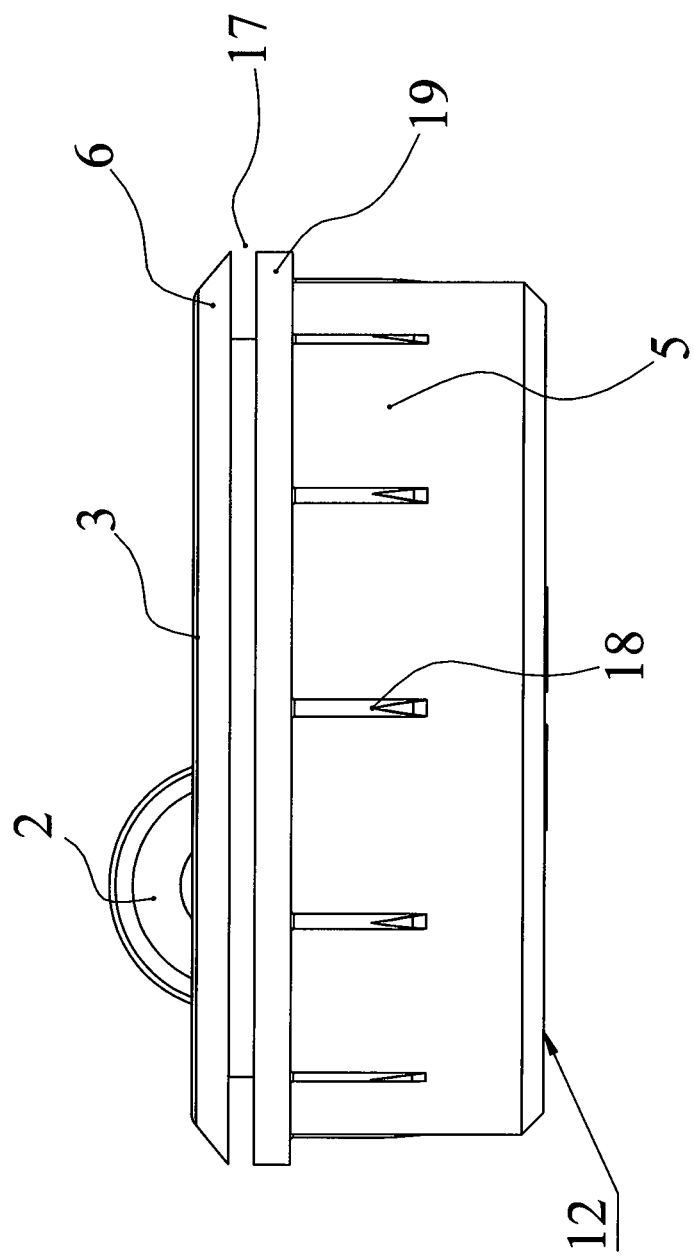
FIG. 8 shows a side view of the wheel assembly shown in FIG. 2.

FIG. 8 illustrates a surface side view of the whole wheel assembly of FIG. 2. The outer housing 5 part has many thin longitudinal mounting ribs 18 that are at a regular interval and parallel to each other as they line the outer circumference of the outer housing part 5. These ribs 18 start tapered on one end then get wider toward the lip 19 of outer housing part 5. This is to ensure tight fit of wheel assembly into its housing space A in as shown in FIG. 1. The lip like structure 19 part of the outer housing 5 shown functions to secure the caster in its housing space and prevent it from further slipping into its housing space A than needed for the wheel assembly to function properly. This mounting method is one example of many different methods of securing the wheel assembly into its mounted space. The inner carriage 3 part of wheel assembly has the wheel 2 mounted in it and partially protruding outside of the wheel assembly as shown in FIG. 8. Also, side view shows the tapered circumferential lip 6 part of the inner carriage 3 to function not only to keep debris and the like from entering the space 17 between the carriage part 3 and outer housing part 5 but also enables wheel assembly to glide on such surfaces as carpet and the like in which it will be in contact with in such an instance.

FIG. 9 illustrates a cross section of the wheel assembly. A detailed figure showing the carriage part 3 fitting in and assembling with outer housing part 5 locking together by tabs 16 at same time allowing rotational movements between them freely as aided by low friction means between surfaces 13 and 14 (and space there between), and channels 11 and 15. Also, FIG. 9 illustrates the position of the wheel 2 in relation to the rest of the wheel assembly. The carriage part 3 includes an outer tapered lip 6 to block debris from entering between the carriage wheel assembly and the outer housing and impeding rotation and allowing smooth sliding on surfaces that the wheel will be difficult to roll on.

Structural details and function of each part of wheel assembly has been discussed in previous figures.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof;

and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A swivel wheel assembly, comprising:
   an outer housing;
   a carriage wheel assembly rotatably received in and rotating relative to the outer housing about an axis, the carriage wheel assembly including a carriage and a wheel rotatably mounted within and rotating relative to the carriage about an axis different from the axis that the carriage wheel assembly rotates about, the wheel including a longitudinal length and a diameter, and the longitudinal length of the wheel is greater than the diameter of the wheel, maximizing weight distribution on the wheel and minimizing marking or damaging a contacting surface,
   wherein the outer housing includes an outer lip and the carriage includes an outer lip that overlaps the outer lip of the outer housing to block debris from entering between the carriage wheel assembly and the outer housing and impeding rotation and allowing smooth sliding on surfaces that the wheel will be difficult to roll on.

2. The swivel wheel assembly of claim 1, wherein one of the carriage wheel assembly and the outer housing includes a hole and the other of the carriage wheel assembly and the outer housing includes one or more projections that is rotatably received in the hole to allow the carriage wheel assembly to be rotatably received in and rotating relative to the outer housing.

3. The swivel wheel assembly of claim 2, wherein the carriage wheel assembly includes the hole and the outer housing includes the one or more projections that is rotatably received in the hole to allow the carriage wheel assembly to be rotatably received in and rotating relative to the outer housing.

4. The swivel wheel assembly of claim 1, wherein the outer housing and the carriage wheel assembly are concentric.

5. The swivel wheel assembly of claim 1, wherein the wheel is cylindrical.

6. The swivel wheel assembly of claim 1, wherein the carriage includes a distal end and the wheel is rotatably mounted to the carriage at the distal end.

7. The swivel wheel assembly of claim 1, wherein the wheel is cylindrical, the carriage includes a distal end, and the wheel is rotatably mounted to the carriage at the distal end, maintaining sufficient clearance between the distal end and the contacting surface while minimizing tipping factor.

8. The swivel wheel assembly of claim 1, wherein both the outer housing and the carriage wheel assembly include respective annular channels that cooperate to form a single bearing channel configured to receive bearings to minimize rotational friction between the outer housing and the carriage wheel assembly as the carriage wheel assembly rotates relative to the outer housing.

9. A swivel wheel assembly, comprising:
   an outer housing;
   a carriage wheel assembly rotatably received in and rotating relative to the outer housing about an axis, the carriage wheel assembly including a carriage and a wheel rotatably mounted within and rotating relative to the carriage about an axis different from the axis that the carriage wheel assembly rotates about, the wheel including a longitudinal length and a diameter, and the longitudinal length of the wheel is greater than the diameter of the wheel, maximizing weight distribution on the wheel and minimizing marking or damaging a contacting surface,
   wherein the carriage wheel assembly includes a hole and the outer housing includes one or more projections that is rotatably received in the hole to allow the carriage wheel assembly to be rotatably received in and rotating relative to the outer housing,
   the one or more projections include a plurality of flexible tabs that are both lockingly engaged within and rotatably received within the hole to allow the carriage wheel assembly to be rotatably received in and rotating relative to the outer housing.

10. The swivel wheel assembly of claim 9, wherein the plurality of flexible tabs together form a larger diameter head and a smaller diameter shaft that are received within the hole to allow the carriage wheel assembly to be rotatably received in and rotating relative to the outer housing.

11. The swivel wheel assembly of claim 10, wherein the outer housing includes a center hole lined with the plurality of flexible tabs.

12. A swivel wheel assembly, comprising:
   an outer housing;
   a carriage wheel assembly rotatably received in and rotating relative to the outer housing about an axis, the carriage wheel assembly including a carriage and a wheel rotatably mounted within and rotating relative to the carriage about an axis different from the axis that the carriage wheel assembly rotates about, the wheel including a longitudinal length and a diameter, and the longitudinal length of the wheel is greater than the diameter of the wheel, maximizing weight distribution on the wheel and minimizing marking or damaging a contacting surface,
   wherein the carriage includes an outer tapered lip to block debris from entering between the carriage wheel assembly and the outer housing and impeding rotation and allowing smooth sliding on surfaces that the wheel will be difficult to roll on.

* * * * *